(12) United States Patent
Paumier et al.

(10) Patent No.: US 6,848,485 B1
(45) Date of Patent: Feb. 1, 2005

(54) STUMP GRINDING APPARATUS HAVING A ROTATABLE TOOTHED DISC

(75) Inventors: James Paumier, Canton, OH (US); Kenneth Monyak, Abingdon, VA (US)

(73) Assignee: Sandvik Mgt LLC, Bristol, VA (US)

( * ) Notice: Subject to any disclaimer, the term of this patent is extended or adjusted under 35 U.S.C. 154(b) by 0 days.

(21) Appl. No.: 10/760,305

(22) Filed: Jan. 21, 2004

(51) Int. Cl.[7] .............................. B27C 1/00; H01G 23/06
(52) U.S. Cl. .................... 144/235; 144/24.12; 144/241; 144/334; 299/102; 241/294
(58) Field of Search .............................. 144/24.12, 218, 144/235, 241, 334; 241/294; 407/33, 34, 46, 101; 299/78, 102; 37/301, 302

(56) References Cited

U.S. PATENT DOCUMENTS

| | | | | |
|---|---|---|---|---|
| 3,570,566 A | * | 3/1971 | McCreery | 144/24.12 |
| 3,797,544 A | * | 3/1974 | Ver Ploeg | 144/235 |
| 3,935,887 A | * | 2/1976 | Van Zante et al. | 144/235 |
| 4,530,385 A | | 7/1985 | York | |
| 4,759,394 A | * | 7/1988 | Clemenson | 144/235 |
| 4,827,995 A | * | 5/1989 | Wilson | 144/24.12 |
| 5,365,986 A | * | 11/1994 | Hooser | 144/231 |
| 5,497,815 A | * | 3/1996 | Bowling | 144/241 |
| 6,024,143 A | * | 2/2000 | Ritchey | 144/24.12 |
| 6,138,725 A | * | 10/2000 | Leonardi et al. | 144/235 |
| 6,382,277 B1 | | 5/2002 | Paumier et al. | |
| 6,546,977 B1 | * | 4/2003 | Monyak et al. | 144/235 |
| 6,698,477 B1 | * | 3/2004 | Bennington | 144/235 |
| 6,708,743 B2 | * | 3/2004 | Ziehm | 144/24.12 |

* cited by examiner

*Primary Examiner*—Kurt Fernstrom
(74) *Attorney, Agent, or Firm*—Burns, Doane, Swecker, Mathis, L.L.P.

(57) ABSTRACT

A stump grinding mechanism includes a disc having recesses formed in an outer peripheral surface thereof. Peripheral cutting assemblies are mounted in respective recesses. Each cutting assembly includes a holder fixed in the recess, and a cutter tooth mounted in the holder. The cutter tooth includes a shank extending through the holder and secured thereto by a nut. The nut is disposed within a pocket of the holder to be shielded during a cutting operation. The holder includes gauge marks to facilitate a proper angular orienting of the cutting assembly within the recess. Some of the cutter teeth have flat cutter faces optimized for cutting wood fiber, whereas others of the cutter teeth have cutter faces defined by converging surface portions to be optimized for cutting/displacing rocks.

12 Claims, 4 Drawing Sheets

STUMP GRINDING APPARATUS HAVING A ROTATABLE TOOTHED DISC

BACKGROUND OF THE INVENTION

The present invention relates to a tree stump grinding apparatus for disintegrating wood material.

Conventional stump grinders are disclosed in U.S. Pat. Nos. 6,382,277 and 6,546,977, for example. Typically, the stump grinder includes a rotatable wheel or disc having a plurality of side cutting teeth projecting from the side surfaces of the disc and peripheral cutting teeth spaced about an outer peripheral edge surface of the disc. Each of the side and peripheral cutting teeth includes a cutting head, having a cutting edge. In use, the disc is driven about a horizontal axis, whereupon the cutting heads of the side and peripheral teeth contact and gradually disintegrate a stump.

It is desirable for the peripheral cutting teeth to be disposed at different respective angular orientations relative to the plane of the disc to provide maximum coverage with each rotation of the disc. To achieve that multi-orientation feature in a device such as disclosed in U.S. Pat. No. 6,382,277, wherein the holder for the peripheral cutting teeth are actually mounted in the side surfaces, it is necessary to provide peripheral cutters that are different from one another, which increases manufacturing and inventory costs. To achieve the multi-orientation feature in a device such as disclosed in U.S. Pat. No. 6,546,977, wherein the holders for the peripheral cutting teeth are mounted on the floors of respective recesses formed in the disc's peripheral edge surface, it is necessary to move each holder in two directions relative to an adjacent holder in order to properly position the peripheral cutting teeth, which represents an undesirably complex maneuvering.

In U.S. Pat. No. 4,530,385, a stump cutter is disclosed (see FIG. 1) which includes a disc 10 having side cutter teeth 12s and two circumferentially spaced peripheral cutter assemblies 12p disposed in respective recesses 18 formed in the disc's outer peripheral surface. Each cutter assembly comprises a holder 20 and a peripheral cutting tooth 30 mounted in the holder. Each holder is attached to leading and trailing (i.e., circumferentially spaced) walls 22, 24 of the recess. The two holders 20 shown in FIG. 1 are tilted in opposite respective directions, i.e., to the right and left sides of the disc. A shank 31 of each peripheral cutter tooth 30 extends through a hole in the holder and is tightly secured thereto by a fastener nut 32 which is threaded onto the shank with the intention of rendering the tooth immovable. However, during a stump-cutting operation, strong loads will be applied not only to the tooth, but also to the nut, which is exposed. That is, the nuts may be contacted by a stump, or rocks, dirt, etc., disposed adjacent to the stump, causing the nuts to loosen and eventually cause the cutter teeth to become loosened or even lost.

Also, each outer peripheral tooth 12p typically has a flat cutter surface 34 facing in the direction of rotation. Such a configuration of the cutter surface is ideal for cutting through wood fibers, but is highly vulnerable to chipping, cracking and breaking when rocks are encountered.

Therefore, it would be desirable to provide a stump cutter which minimizes or obviates existing shortcomings.

It would be further desirable to provide a stump cutter in which the fastener nuts of peripheral cutter teeth are protected against being turned and loosened during cutting operations.

A further object is to provide teeth that are less susceptible to being chipped, broken, or cracked by rocks.

Another object is to simplify the act of orienting teeth at different angular orientations on a disc.

SUMMARY OF THE INVENTION

One aspect of the invention pertains to a stump grinding apparatus which comprises a disc defining a direction of rotation and a center axis of rotation. The disc includes axially spaced side surfaces and a generally circular outer peripheral surface which defines an outer circumference of the disc. The outer circumference has a maximum diameter which is substantially larger than an axial thickness of the disc. At least eight recesses are formed in the outer peripheral surface and spaced apart about the disc's circumference. Each recess includes leading and trailing walls spaced circumferentially apart and interconnected by a generally radially outwardly facing floor. The apparatus further comprises peripheral cutting assemblies mounted in respective recesses. Each cutting assembly comprises a holder and a cutter tooth mounted therein. The holder is disposed in the respective recess and has leading and trailing end surfaces spaced circumferentially apart and facing the leading and trailing walls of its respective recess. The holder, which is fixably secured to the disc, further includes radially outer and inner surfaces through which a hole extends. The radially inner surface faces the floor of the recess and includes a pocket. The cutter tooth is mounted in the holder and includes a shank extending through the hole. A first end portion of the shank is threaded and extends within the pocket. A cutter head is disposed at a second end portion of the shank and includes a cutting edge. A nut is threaded onto the first end of the shank and is seated within the pocket to be shielded during a cutting operation.

Another aspect of the invention pertains to a stump grinding apparatus wherein the peripheral cutting assemblies comprise first and second peripheral cutting assemblies having first and second cutter teeth, respectively. Each first cutter tooth includes a generally flat cutter surface facing in the direction of rotation of the disc. Each second cutter tooth includes a cutter surface facing generally in the direction of rotation and defined by surface portions which converge in the direction of rotation and intersect to form a cutter edge. The first peripheral cutting assemblies are disposed in some of the recesses, and the second peripheral cutting assemblies are disposed in others of the recesses. Preferably, the first and second cutting assemblies alternate with one another in the circumferential direction of the disc.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
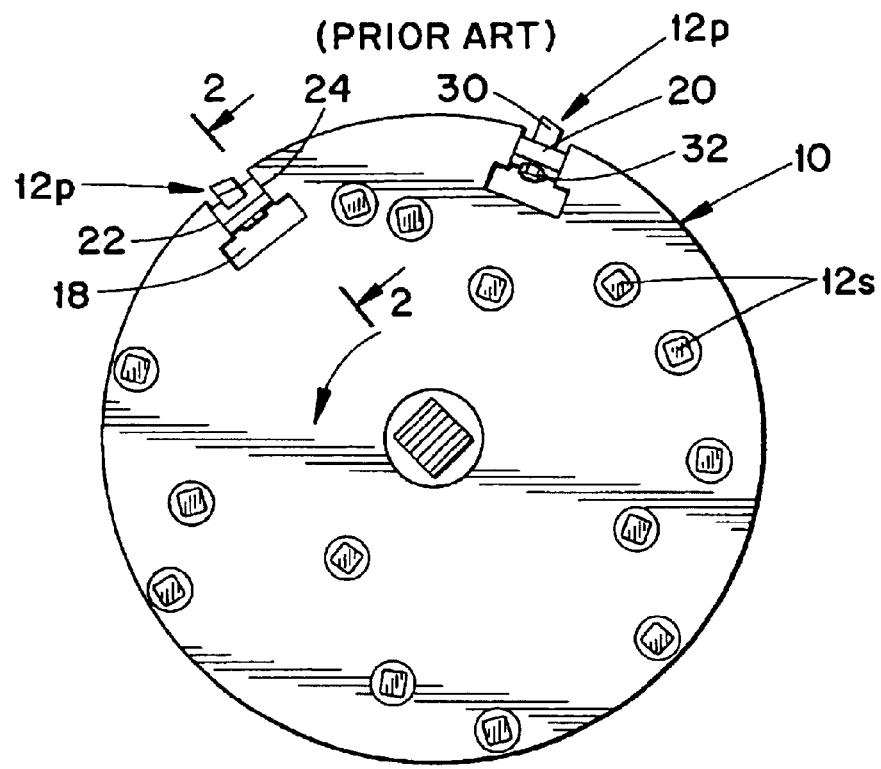
FIG. 1 is a side view of a prior art stump grinding apparatus.
Figure 2:
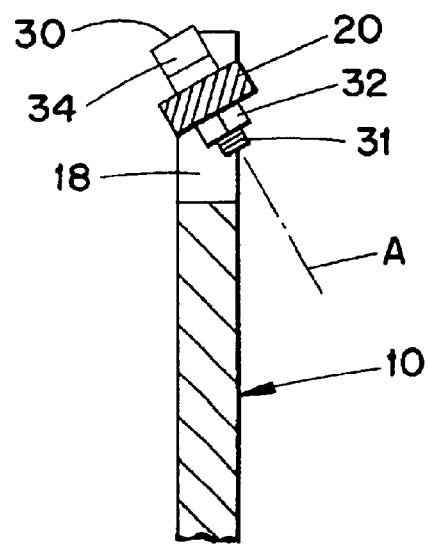
FIG. 2 is a sectional view taken along the line 2-2 in FIG. 1.
Figure 3:
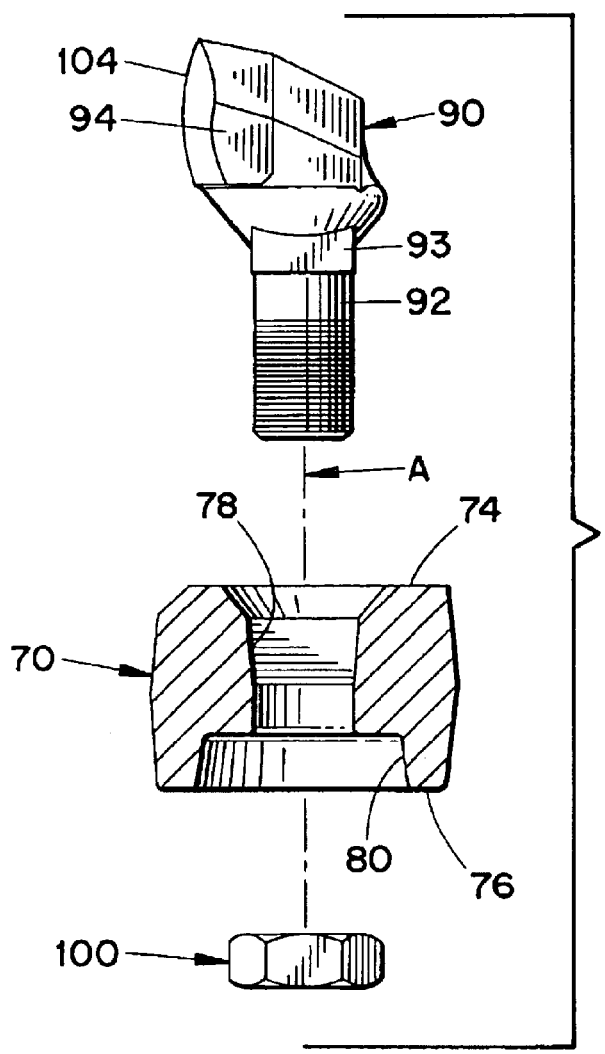
FIG. 3 is an exploded view of a cutting assembly according to the present invention.
Figure 4:
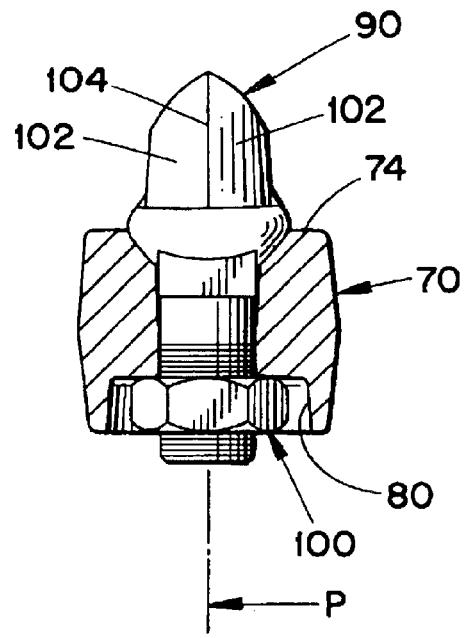
FIG. 4 is a front view of the cutting assembly of FIG. 3.
Figure 8:
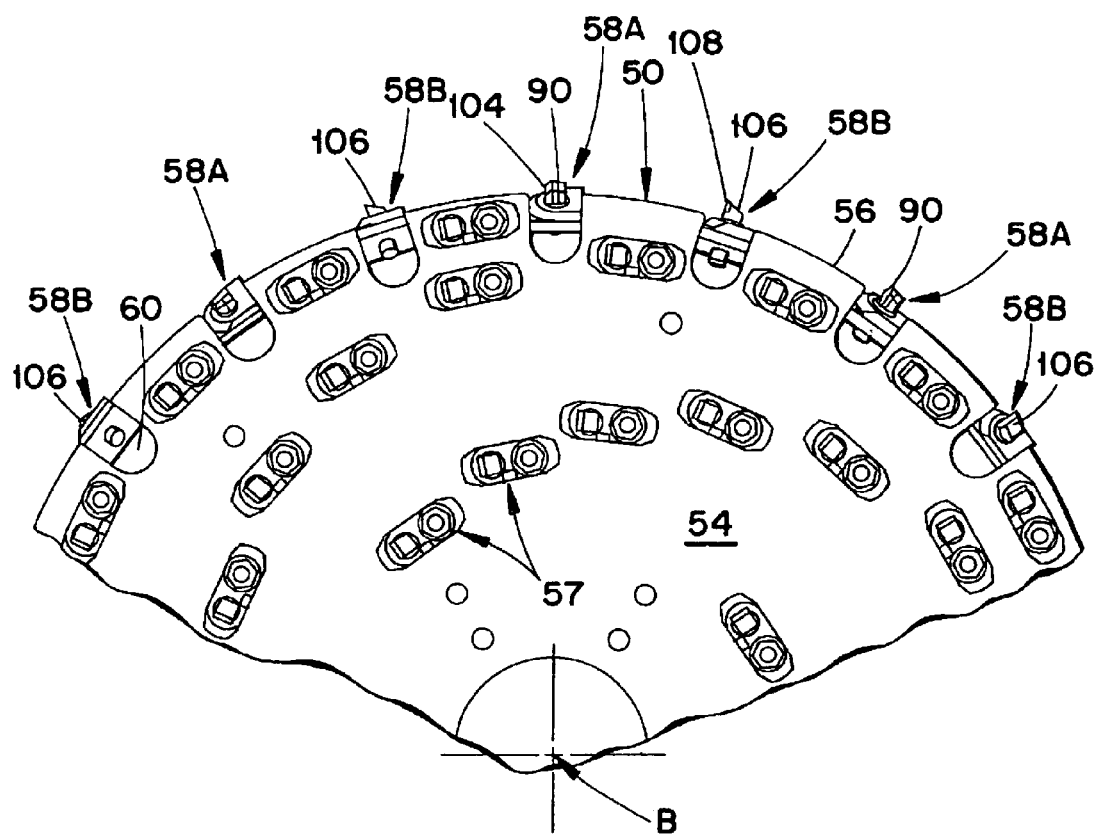
FIG. 8 is a fragmentary view of a stump grinding disc and cutting assemblies according to the present invention.

Depicted in FIG. 8 is a fragment of a stump cutter disc 50 adapted to be connected to a mobile vehicle and driven about a center axis B (in a counter-clockwise direction in FIG. 8). The disc 50 is similar to the prior art disc 10 described earlier in connection with FIG. 1 in that it includes a pair of side surfaces 54 and a relatively narrow, cylindrical outer peripheral surface 56. The disc is adapted to be bolted to a conventional rotary drive mechanism, not shown.

Mounted on the disc are side cutting assemblies 57 and peripheral cutting assemblies 58A, 58B. The side cutting assemblies 57 are preferably the same as those disclosed in U.S. Pat. No. 6,382,277, the disclosure of which is incorporated by reference herein.

Figure 6:
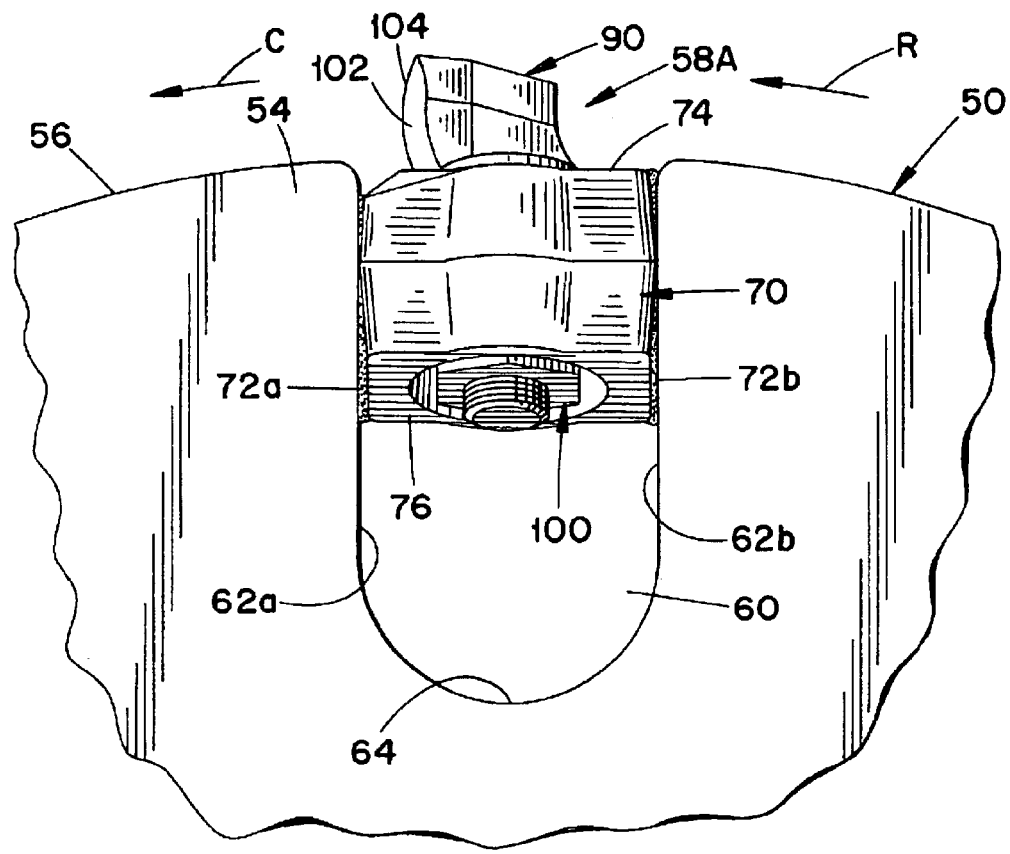
FIG. 6 is a fragmentary side view of a disc in which one of the cutting assemblies is mounted.

The peripheral cutting assemblies 58A, 58B are disposed within respective recesses 60 formed in the outer peripheral surface 56, which surface forms an outer circumference of the disc. That circumference has a maximum diameter which is substantially larger than an axial thickness of the disc (i.e., as measured parallel to the axis of rotation). There are at least eight of the recesses 60, but preferably more. Each recess 60 includes leading and trailing walls 62a, 62b (with reference to the direction of wheel rotation R) that are spaced circumferentially apart, and a radially outwardly facing floor 64 interconnecting the leading and trailing walls (see FIG. 6). Each recess 60 extends completely through the axial thickness of the disc.

The peripheral cutting assemblies 58A and 58B differ from one another as regards the configuration of cutter teeth of those assemblies. Each peripheral cutting assembly 58A includes a holder 70 disposed in the respective recess 60, a cutter tooth 90 mounted in the holder and a nut 100 securing the cutter tooth in the holder. The holder 70 includes leading and trailing surfaces 72a, 72b (with reference to the direction of disc rotation) spaced circumferentially apart so as to face the leading and trailing walls 62a, 62b, respectively, of its respective recess. The holder 70 is fixedly secured to the disc, i.e., preferably the leading and trailing surfaces 72a, 72b are welded to the leading and trailing walls 62a, 62b, respectively.

The holder 70 also includes a generally radially outwardly facing surface 74, and a generally radially inwardly facing surface 76, the latter facing generally towards the floor 64 of the respective recess and spaced radially outwardly therefrom. The outer surface of the holder is beveled to render the holder generally smooth (streamlined) in order to minimize resistance to travel through dirt, stumps, etc.

A hole 78 extends through the holder from the radially outer surface 74 to the radially inner surface 76. Formed around the hole in the radially inner surface 76 is an open pocket 80.

Each cutter tooth 90 includes a shank 92 and a cutter head 94 disposed at an end of the shank opposite a threaded end thereof. The shank 92 extends through the hole 78 of the respective holder, such that the threaded end portion of the shank 92 extends within the pocket 80. The cutter tooth 90 is held against rotation relative to the holder about the center axis of the shank by any suitable structure. Preferably, the end of the hole 78 situated in the radially outer surface 74 has a non-circular (e.g., square) countersink 98, and the base portion 93 of the cutter head 94 that is received in the countersink 98 is of corresponding non-circular shape. The cutter head 94 is of conventional design and is preferably formed of carbide and is suitably fixed to the shank which is preferably formed of steel. The cutter head includes a cutter surface portion formed by a pair of surface portions 102 that converge in a direction C oriented transversely of the shank's axis A, whereby the cutter surface faces generally in the direction C, i.e., in the direction of rotation R. The surface portions 102 intersect to form a convexly curved cutting edge 104 lying in a plane P that also contains the shank's center axis A.

In order to secure the cutter tooth 90 within the holder, the nut 100 is threaded onto the threaded end of the shank and is seated within the pocket 80. The pockets 80 are larger in cross section than the nuts 100 to enable a socket wrench to be inserted into the pockets to grip the nuts. When seated in its pocket, the nut is shielded during a cutting operation and thus cannot be contacted by the stump or surrounding dirt, rocks, etc., which could cause the nut to become unscrewed.

Accordingly, rotation of the cutter teeth 90 is prevented by their being tightly drawn into the countersinks 98 by the nuts 100, and the nuts 100 are shielded by being disposed in the pockets 80.

Figure 5:
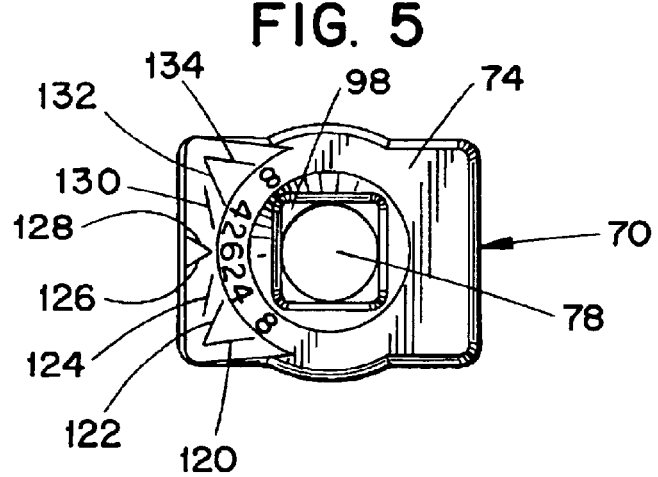
FIG. 5 is a top view of a holder part of the cutting assembly.
Figure 7:
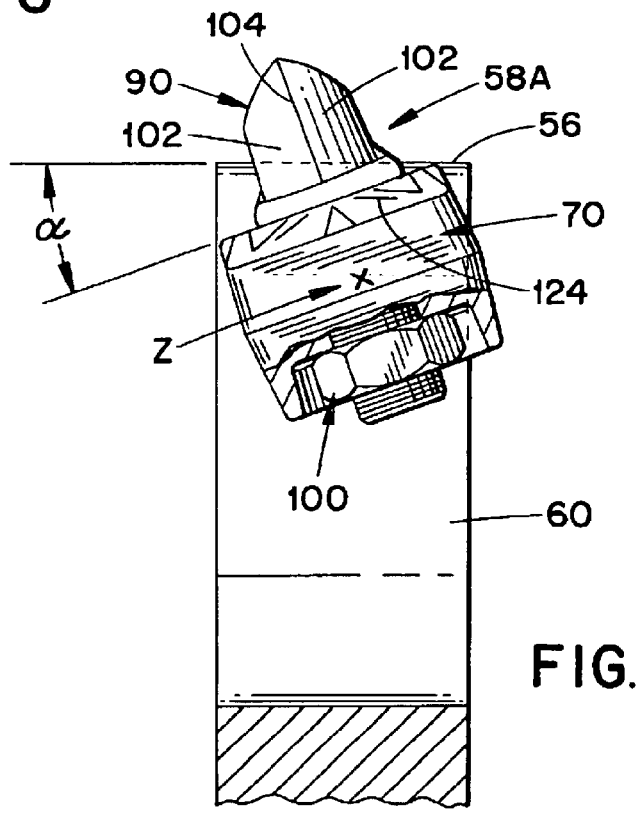
FIG. 7 is a sectional view taken through the disc of FIG. 6 to depict the front end of the cutting assembly, with the holder thereof partially broken away to depict a retaining nut seated in a pocket of the holder.

The holders 70 are preferably angled at different inclinations with respect to a plane of the wheel. The inclinations of the holders can be conveniently set by an operator prior to welding the holders to the disc, because each holder 70 includes a series of gauge marks 120-134 (see FIG. 5) that represent respective angular inclinations. By positioning the holders such that a respective gauge mark lies parallel to the outer peripheral surface 56 of the wheel, it can be assured that the holder is disposed in a respective angular inclination. For example, in FIG. 7 the holder has been rotated about an axis Z extending through the leading and trailing end surfaces 72a, 72b so that the gauge mark 124 thereof is parallel to the wheel's peripheral surface 56, thereby positioning the holder at a 20° angle α.

It will be appreciated that the teeth 90 of the cutting assemblies 58A are designed for optimum engagement with rocks, as explained earlier. The teeth 106 of the cutting assemblies 58B, on the other hand, have a generally flat cutter surface 108 facing in the direction of rotation and are thus more suited to cutting through wood fiber while being susceptible to chipping, cracking and breaking when encountering rocks. When assembling the cutter teeth in the disc, it is preferred that the teeth 90 are disposed in alternating ones of the recesses 60 in order for the teeth 90 to be disposed in circumferentially alternating relationship with the cutter teeth 106 as shown in FIG. 8. Thus, during a stump cutting operation, the teeth 106 effectively cut through wood fiber, whereas the teeth 90 effectively push rocks aside or fracture them into pieces before they are engaged by the teeth 106, so that there is less chance for the teeth 106 to be damaged by the rocks. The nuts 100 securing the teeth 106 are, like the nuts securing the teeth 90, shielded within pockets of the receptive holders so as to minimize chances of the nuts becoming loosened.

It will be appreciated that a stump grinding apparatus according to the invention is easier to assemble, due to the provision of gauge marks on the tooth holders. Moreover, the teeth are less likely to become loosened during a cutting operation, since their securing nuts are shielded in pockets. Damage to the teeth is less likely to occur, because rock cutting/displacing teeth are provided which are able to minimize the ability of rocks to inflict damage on teeth that are suited to cutting wood fiber.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A stump grinding apparatus comprising:
    a disc defining a direction of rotation and a center axis, the disc including axially spaced side surfaces and a generally circular outer peripheral surface, the outer peripheral surface defining an outer circumference of the disc, the outer circumference having a maximum diameter substantially larger than an axial thickness of the disc, there being at least eight recesses formed in the outer peripheral surface and spaced circumferentially apart, each recess including leading and trailing walls spaced circumferentially apart and a generally radially outwardly facing floor interconnecting the leading and trailing walls; and
    peripheral cutting assemblies mounted in respective ones of the recesses, each cutting assembly comprising:
        a holder disposed in the respective recess and fixed to the disc, the holder having leading and trailing end surfaces spaced circumferentially apart and facing the leading and trailing walls of its respective recess, the holder further including radially outer and inner surfaces through which a hole extends, the radially inner surface facing generally toward the floor of the recess and including an open pocket;
        a cutter tooth mounted in the holder and including a shank extending through the hole, wherein a threaded first end portion of the shank extends within the pocket, the cutter tooth further including a cutter head disposed at a second end portion of the shank; and
        a nut threaded onto the first end of the shank and seated within the pocket to be shielded during a cutting operation.

2. The stump grinding apparatus according to claim 1 wherein a first plurality of the cutting assemblies include first cutter teeth, and a second plurality of the cutting assemblies include second cutter teeth; the first and second cutting assemblies alternating with one another in a circumferential direction of the wheel; each first cutter tooth including a generally flat cutter surface facing in the direction of rotation of the disc; each second cutter tooth including a cutter surface facing in the direction of rotation and defined by surface portions converging in the direction of rotation, the surface portions intersecting to form a cutter edge.

3. The stump grinding apparatus according to claim 2 wherein the cutter edge lies substantially in an imaginary plane containing the shank's center axis.

4. The stump grinding apparatus according to claim 3 wherein the cutter edge is convexly curved.

5. The stump grinding apparatus according to claim 1, further including a plurality of side cutting units mounted to, and projecting from, the side surfaces.

6. The stump grinding apparatus according to claim 1 wherein at least some of the holders are disposed in mutually different angular orientations relative to a plane of the disc, wherein the angular orientation of each holder is defined in relation to an imaginary axis extending through both the leading and trailing end surfaces to position the cutting edges of such holders at mutually different angular orientations relative to the outer peripheral surface of the disc.

7. The stump grinding apparatus according to claim 6 wherein each holder includes a plurality of gauge marks selectively positionable with respect to a part of the wheel to define respective angular orientations of the holder.

8. The stump grinding apparatus according to claim 1 wherein the radially inner surface of the holder is spaced radially outwardly from the floor of the respective recess.

9. The stump grinding apparatus according to claim 1, wherein the leading and trailing end surfaces of the holder are welded respectively to the leading and trailing walls of a respective recess.

10. A stump grinding apparatus comprising:
    a disc defining a direction of rotation about a center axis, the disc including axially spaced side surfaces and a generally circular outer peripheral surface, the outer peripheral surface defining an outer circumference of the disc, the outer circumference having a maximum diameter substantially larger than an axial thickness of the disc, there being at least eight recesses formed in the outer peripheral surface and spaced circumferentially apart, each recess including leading and trailing walls spaced circumferentially apart and a generally radially outwardly facing floor interconnecting the leading and trailing walls; and
    peripheral cutting assemblies mounted in respective ones of the recesses, each cutting assembly comprising:
        a holder disposed in the respective recess and fixed to the disc, and
        a cutter tooth mounted in the holder;
    the peripheral cutting assemblies comprising first and second peripheral cutting assemblies having first and second cutter teeth, respectively, each first cutter tooth including a generally flat cutter surface facing generally in the direction of rotation of the disc; each second cutter tooth including a cutter surface facing generally in the direction of rotation and defined by surface portions converging in the direction of rotation, the surface portions intersecting to form a cutter edge; wherein the first peripheral cutting assemblies are disposed in some of the recesses, and the second peripheral cutting assemblies are disposed in others of the recesses.

11. The stump grinding apparatus according to claim 10 wherein the cutting edge of each second cutter tooth lies substantially in an imaginary plane containing the shank's center axis.

12. The stump grinding apparatus according to claim 11 wherein the cutting edge is convexly curved.

* * * * *